United States Patent
Gray

(10) Patent No.: US 9,466,976 B2
(45) Date of Patent: Oct. 11, 2016

(54) ACTIVE TRANSIENT VOLTAGE SUPPRESSION DEVICE

(71) Applicant: OECO, LLC, Milwaukie, OR (US)

(72) Inventor: Nicolas McGhee Gray, Portland, OR (US)

(73) Assignee: OECO, LLC, Milwaukee, OR (US)

( * ) Notice: Subject to any disclaimer, the term of this patent is extended or adjusted under 35 U.S.C. 154(b) by 93 days.

(21) Appl. No.: 14/278,911

(22) Filed: May 15, 2014

(65) Prior Publication Data

US 2014/0340799 A1     Nov. 20, 2014

Related U.S. Application Data

(60) Provisional application No. 61/823,789, filed on May 15, 2013.

(51) Int. Cl.
  *H02H 9/00* (2006.01)
  *H02H 9/04* (2006.01)

(52) U.S. Cl.
  CPC ............ *H02H 9/005* (2013.01); *H02H 9/041* (2013.01)

(58) Field of Classification Search
  CPC ......... H02H 9/005; H02H 9/04; H02H 9/041
  USPC ......................................................... 361/56
  See application file for complete search history.

(56) References Cited

U.S. PATENT DOCUMENTS

| | | | | |
|---|---|---|---|---|
| 4,298,864 A * | 11/1981 | Mahnke | ............ | G01R 19/16571 340/649 |
| 6,084,464 A * | 7/2000 | Lin | ..................... | H01L 27/0629 257/E23.146 |
| 8,837,099 B2 * | 9/2014 | Coln | .................... | H01L 27/0255 361/56 |
| 2007/0297105 A1* | 12/2007 | Brennan | ............. | H01L 27/0251 361/56 |
| 2010/0238599 A1* | 9/2010 | Liang | ............... | H03K 19/00315 361/56 |

* cited by examiner

*Primary Examiner* — Thienvu Tran
*Assistant Examiner* — Kevin J Comber
(74) *Attorney, Agent, or Firm* — Kelley Drye & Warren LLP

(57) ABSTRACT

An active transient voltage suppression device is disclosed which may utilize an activation network to turn on a semiconductor switch. The activation network may be triggered based on the rate of change of voltage on the protected input of the device. More than one such device may be cascaded in parallel to increase energy dissipation without device screening and may provide a stable voltage limit over a wide range of operating currents. The device may be tested for open and short failure modes in circuit.

22 Claims, 2 Drawing Sheets

ACTIVE TRANSIENT VOLTAGE SUPPRESSION DEVICE

CROSS REFERENCE TO RELATED APPLICATIONS

This application relates to, and claims the benefit of the earlier filing date and priority of U.S. Provisional Patent Application No. 61/823,789, filed on May 15, 2013, entitled "Active Transient Voltage Suppression Device."

FIELD OF THE INVENTION

The present invention relates to systems and methods for protecting electrical systems from being damaged by transient voltages.

BACKGROUND

Electrical systems require protection against transient voltages which can damage internal system components. The need to provide protection from transient voltages may be more acute as a result of the increased use of composite structures, as opposed to aluminum, in vehicles containing electrical systems requiring such protection. The increased use of composite structures may reduce the attenuation of electromagnetic transient events in the electrical systems provided in vehicles incorporating such composite structures. Without the protective attenuation of metallic structures, such as those made of aluminum, transient voltage suppression devices which can be tested in circuit may be used to help prevent critical system components from being left unprotected.

The prior art may include systems incorporating one of several types of transient voltage protection methods or devices, such as Avalanche (TVS) diodes, Metal-Oxide Varistors (MOVs), and hybrid spark-gap devices. All of these methods or devices may not be able to be tested in circuit without high power circuits and may behave nonlinearly over wide operating current ranges.

SUMMARY OF THE INVENTION

Responsive to the foregoing challenges, Applicant has developed an innovative circuit for suppressing transient voltage pulses, comprising: a power line adapted to connect a voltage source to a protected device; a grounded chassis line; an activation network having a first terminal connected to the power line, a second terminal connected to the chassis line, an input terminal, and an output terminal; a semiconductor switch having a first terminal connected to the power line, a second terminal connected to a short circuit monitor node, and a gate or base connected to the activation network output terminal; a fault indicator having a first terminal connected to the power line and a second terminal connected to the short circuit monitor node; and a circuit disconnection element having a first terminal connected to the short circuit monitor node and a second terminal connected to the chassis line.

Applicant has further developed an innovative shunt circuit, comprising: a voltage source node adapted to be connected to a protected device; a ground node; an activation network connected by separate terminals to the voltage source node and the ground node, and having an input terminal and an output terminal; a fault indicator connected to the voltage source node and a short circuit monitor node; a switch connected to the voltage source node, the short circuit monitor node, and the activation network output terminal; and a fuse or circuit breaker connected to the short circuit monitor node and the ground node.

Applicant has still further developed an innovative method of suppressing the application of transient voltage to a protected device using a circuit having an activation network, a semiconductor switch and a fault indicator, said method comprising: applying a stimulus voltage to the activation network while powering a protected device; activating a fault indicator to provide a perceptible output responsive to the application of the stimulus voltage when the semiconductor switch is failed in an open state; applying a powering voltage to the protected device, the activation network, the semiconductor switch, and the fault indicator; detecting a rate of change of the powering voltage using the activation network; and shunting the powering voltage to ground across the semiconductor switch responsive to the activation network detecting a rate of voltage change greater than a preset limit.

It is to be understood that both the foregoing general description and the following detailed description are exemplary and explanatory only, and are not restrictive of the invention as claimed.

BRIEF DESCRIPTION OF THE DRAWING

In order to assist the understanding of this invention, reference will now be made to the appended drawings, in which like reference numerals refer to like elements. The drawings are exemplary only, and should not be construed as limiting the invention.

DETAILED DESCRIPTION OF PREFERRED EMBODIMENTS OF THE INVENTION

Figure 1:
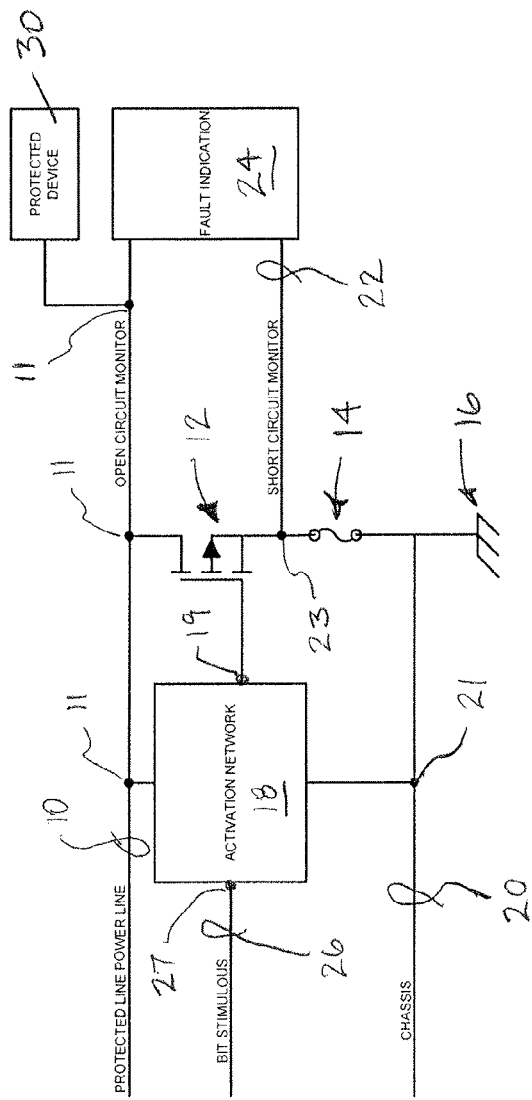
FIG. 1 is a schematic diagram of an active transient voltage suppression device system installation in accordance with embodiments of the present invention.

Reference will now be made in detail to a preferred embodiment of the present invention, an example of which is illustrated in the accompanying drawing. With reference to FIG. 1, the circuit diagram and elements of an active transient voltage suppression (ATVS) device, configured in accordance with an embodiment of the present invention, is shown. The ATVS device may be used to prevent a protected device 30 from being subjected to transient voltages applied by a voltage source (not shown) to power the protected device. The ATVS device may include an activation network 18 which is connected at a voltage source node 11 to a protected power line 10, and to a grounded chassis line 20 at a ground node 21. The activation network 18 may be further connected to a stimulus voltage source (not shown) at an input node 27 over a bit stimulus line 26, and to a gate or base junction of a semiconductor switch 12 at an output node 19. The ATVS activation network 18 may measure the rate of change of voltage on the protected line 10. Specifically, the activation network 18 may determine if the rate of voltage change exceeds a specified rate or preset limit which could cause damage to, or interfere with the operation of, the protected device 30.

The semiconductor switch 12 may preferably be a field effect transistor (FET), bipolar device, or insulated-gate bipolar transistor (IGBT). The semiconductor switch 12 may be connected to the protected power line 10 at a voltage source node 11, and to a fault indicator 24 at a short circuit monitor node 23. The semiconductor switch 12 may be operated under the control of the activation network 18 to selectively connect or shunt the protected power line 10 to a ground node 16 on the grounded chassis line 20. The shunt path to ground may include a circuit disconnection element 14, such as a fuse or circuit breaker.

The fault indicator 24 may be connected to the power line 10 at a power line node 11, and to a short circuit monitor node 23 via a short circuit monitor line 22. The fault indicator 24 may include means for providing a visually, tactilely or audibly perceptible output or alarm to indicate failure of the semiconductor switch 12. The fault indicator 24 may measure the voltage across the semiconductor switch 12 and the circuit disconnection element 14 to determine whether the semiconductor switch 12 or the circuit disconnection element 14 have failed. For example, if there is no voltage detected across the semiconductor switch 12 when the stimulus voltage is applied to the activation network 18 and the powering voltage is applied to the power line 10, an indication of failure of the semiconductor switch in an open condition may be provided by the fault indicator 24. If there is no voltage detected across the circuit disconnection element 14 when voltage is detected across the semiconductor switch 12, an indication of failure of the circuit disconnection element (e.g., a blown fuse) may be provided by the fault indicator 24.

Figure 2A:
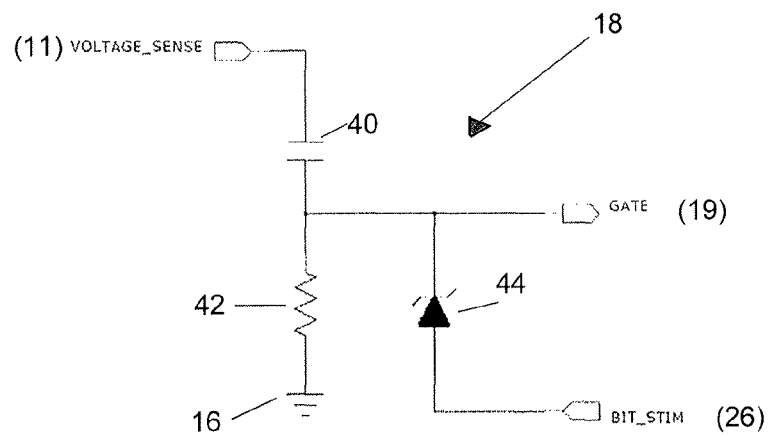
FIG. 2A is a schematic diagram of an activation network in accordance with a first embodiment of the present invention.

With reference to FIGS. 1 and 2A, the activation network 18 of a first embodiment of the present invention may include one or more passive circuit components, such as capacitors and resistors. For example, a capacitor 40 and a resistor 42 may differentiate the applied transient voltage sensed at the voltage source node 11 providing a voltage to the gate connected to the output node 19 of the suppression device. This differentiation process may cause the suppression device to behave like a large capacitor on the protected line, preventing large rates of change of voltage. A zener diode 44 may provide two functions: a path for the circuitry of the bit stimulus line 26 to test the suppression device as well as a means for clamping the voltage supplied to the gate connected to the output node 19 of the suppression device to prevent damage.

Figure 2B:
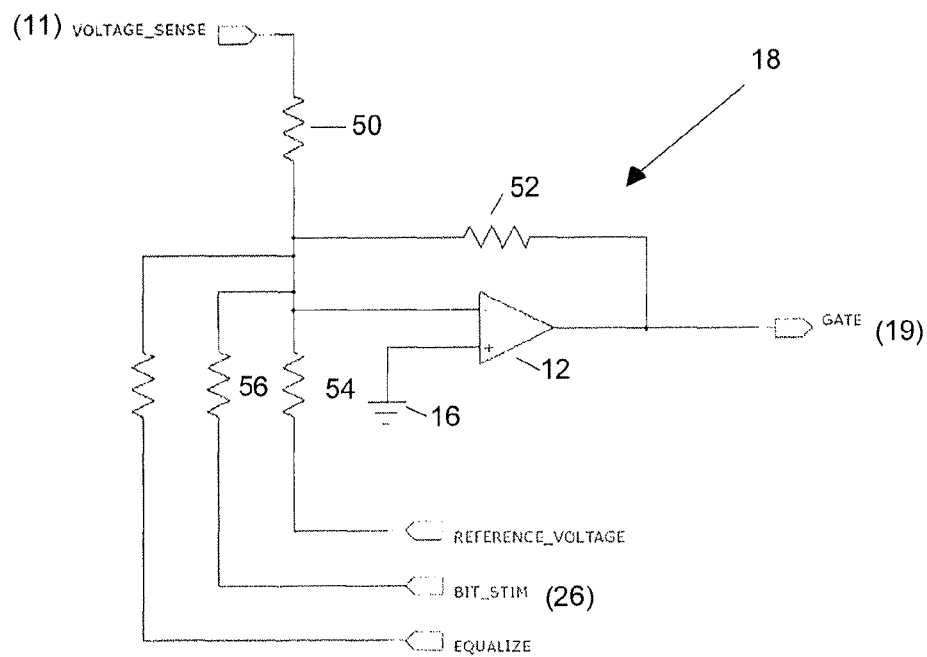
FIG. 2B is a schematic diagram of an activation network in accordance with a second embodiment of the present invention.

With reference to FIGS. 1 and 2B, the activation network 18 of a second embodiment of the present invention may include active circuit components, such as transistors. For example, the portion of the network formed by resistors 50, 52 and 54 may provide a negative feedback loop to control the gate connected at the output node 19 of the suppression device, actively. These impedances may be purely resistive or, in alternative embodiments, include reactive components to adjust the dynamic response of the control loop. The voltage sensed at the voltage source node 11 may be subtracted from the reference voltage which must be set higher than the normal operating voltage of the protected line 10. When the sensed voltage exceeds the commanded reference voltage, the gate of the semiconductor switch 12 may be activated to shunt the transient energy on the protected line 10 to ground 16. The bit stimulus line 26 voltage also may be summed into the voltage source node 11 across resistor 56 to activate the suppression device for built in testing. The active network illustrated in FIG. 2B may allow for equalization of transient current when suppression devices are used in parallel.

The activation network 18 designs illustrated in FIGS. 2A-B are illustrative only, and not intended to limit the scope of the invention to the depicted embodiments.

In an exemplary embodiment, the ATVS device may be used to suppress the application of transient voltage to the protected device 30, as follows. Testing of the ATVS device during operation of the protected device may be conducted by applying a stimulus voltage to the input terminal 27 of the activation network 18 while powering the protected device 30 via the power line 10. The application of the stimulus voltage may be sufficient to cause the semiconductor switch 12 to connect the power line 10 to the short circuit monitor node 23. If no voltage is detected across the semiconductor switch 12, the fault indicator 24 may indicate that the semiconductor switch has failed in an open condition. The voltage across the circuit disconnection element 14 may also be detected by the fault indicator 24 to determine whether the circuit disconnection element 14 has failed. The ATVS device may be tested for proper functionality at power-up and continuously during operation of the protected device 30.

Transient voltage suppression may be provided while powering the protected device by using the activation network to detect a rate of change of the powering voltage. If the detected rate of voltage change exceeds a preset limit, the semiconductor switch 12 will close under the control of the activation network 18, causing the power line 10 voltage to shunt to ground 16 across the semiconductor switch and the circuit disconnection element 14. Excessive transient voltages may cause the semiconductor switch 12 to short the protected power line 10 to the grounded chassis line 20 to dissipate the electromagnetic energy generated. Should the semiconductor switch 12 fail in a closed condition, the circuit disconnection element 14 may disconnect the shunt path to prevent a persistent short from rendering the protected device 30 inoperable. In the foregoing manner, the ATVS device may maintain stable voltage clamping over a wide range of operating currents, provided consistent rate of change of voltage on the power line.

It will be apparent to those skilled in the art that variations and modifications of the present invention can be made without departing from the scope or spirit of the invention. It is intended that the present invention cover all such modifications and variations of the invention, provided they come within the scope of the appended claims and their equivalents.

What is claimed:

1. A circuit for suppressing transient voltage pulses, comprising:
   a power line adapted to connect a voltage source to a protected device;
   a grounded chassis line;
   an activation network having a first terminal connected to the power line, a second terminal connected to the chassis line, an input terminal, and an output terminal;
   a semiconductor switch having a first terminal connected to the power line, a second terminal connected to a short circuit monitor node, and a gate or base connected to the activation network output terminal;
   a fault indicator having a first terminal connected to the power line and a second terminal connected to the short circuit monitor node; and
   a circuit disconnection element having a first terminal connected to the short circuit monitor node and a second terminal connected to the chassis line;
   wherein a stimulus voltage source is connected to the activation network input terminal.

2. The circuit of claim 1, wherein the circuit disconnection element comprises a fuse or a circuit breaker.

3. The circuit of claim 1, wherein the activation network is adapted to detect a rate of change of the power line voltage.

4. The circuit of claim 1, wherein the semiconductor switch comprises a FET.

5. The circuit of claim 1, wherein the semiconductor switch comprises a bipolar device.

6. The circuit of claim 1, wherein the semiconductor switch comprises an IGBT.

7. The circuit of claim 1, wherein the activation network comprises passive components.

8. The circuit of claim 7, wherein the activation network further comprises an active integrated circuit.

9. The circuit of claim 1, wherein the activation network comprises an active integrated circuit.

10. The circuit of claim 1, further comprising:
a second activation network having a first terminal connected to the power line, a second terminal connected to the chassis line, an input terminal, and an output terminal; and
a second semiconductor switch having a first terminal connected to the power line, a second terminal connected to the short circuit monitor node, and a gate or base terminal connected to the second activation network output terminal.

11. The circuit of claim 1, wherein the stimulus voltage source is adapted to apply a voltage to the semiconductor switch sufficient to activate the semiconductor switch to detect if the semiconductor switch has failed in an open shunted state.

12. A shunt circuit, comprising:
a voltage source node adapted to be connected to a protected device;
a ground node;
an activation network connected by separate terminals to the voltage source node and the ground node, and having an input terminal and an output terminal;
a fault indicator connected to the voltage source node and a short circuit monitor node;
a switch connected to the voltage source node, the short circuit monitor node, and the activation network output terminal;
a fuse or circuit breaker connected to the short circuit monitor node and the ground node; and
a stimulus voltage source connected to the activation network input terminal.

13. The circuit of claim 12, wherein the switch comprises a FET.

14. The circuit of claim 12, wherein the switch comprises a bipolar device.

15. The circuit of claim 12, wherein the switch comprises an IGBT.

16. The circuit of claim 12, wherein the activation network comprises passive components.

17. The circuit of claim 16, wherein the activation network further comprises an active integrated circuit.

18. The circuit of claim 12, wherein the activation network comprises an active integrated circuit.

19. The circuit of claim 12, further comprising:
a second activation network connected to the voltage source node, the ground node, and a second switch.

20. The circuit of claim 19, wherein the second switch is further connected to the fault indicator.

21. A method of suppressing the application of transient voltage to a protected device using a circuit having an activation network, a semiconductor switch and a fault indicator, said method comprising:
applying a stimulus voltage to the activation network while powering a protected device;
activating a fault indicator to provide a perceptible output responsive to the application of the stimulus voltage when the semiconductor switch is failed in an open state;
applying a powering voltage to the protected device, the activation network, the semiconductor switch, and the fault indicator;
detecting a rate of change of the powering voltage using the activation network; and
shunting the powering voltage to ground across the semiconductor switch responsive to the activation network detecting a rate of voltage change greater than a preset limit.

22. The method of claim 21, further comprising:
disconnecting the semiconductor switch from shunting the powering voltage to ground responsive to the shunt to ground exceeding a preset limit.

* * * * *